United States Patent Office 3,515,519
Patented June 2, 1970

3,515,519
APPARATUS FOR ELECTRIC ARC-CRACKING OF HYDROCARBONS
Kurt Sennewald, Knapsack, near Cologne, Ludwig Bender, Bruhl, near Cologne, Klaus Gehrmann, Knapsack, near Cologne, Heinrich Kallrath, Emmerting, near Burghausen, Gunter Peantek, Hermulheim, near Cologne, Erich Schallus, Cologne, Hans-Werner Stephan, Cologne-Klettenberg, and Lothar Strie, Knapsack, near Cologne, Germany, assignors to Knapsack Aktiengesellschaft, Knapsack, near Cologne, Germany
Original application July 30, 1965, Ser. No. 475,938, now Patent No. 3,377,402, dated Apr. 9, 1968. Divided and this application Aug. 3, 1967, Ser. No. 658,082
Claims priority, application Germany, Aug. 11, 1964, K 53,716
Int. Cl. H05b 7/18; C07c 11/24
U.S. Cl. 23—284
3 Claims

ABSTRACT OF THE DISCLOSURE

An apparatus comprises in coaxial arrangement a conventional arc chamber, a circular cylindrical reaction chamber, and a circular cylindrical quenching chamber. Between the arc chamber and the reaction chamber there is an annular inclined slit. The reaction chamber is surrounded by an annular channel. An annular slit is disposed in the entrance portion of a quenching chamber.

CROSS REFERENCE TO RELATED APPLICATION

The present application is a division of application Ser. No. 475,938, filed July 30, 1965, now U.S. Pat. 3,377,402.

The present invention provides a process and apparatus for cracking hydrocarbons with the aid of hydrogen heated in an electric arc, so as to obtain acetylene, ethylene, methane and hydrogen.

Various processes for cracking hydrocarbons with the aid of an electric arc have already been descirbed. For example, in the processes disclosed in German Pats. Nos. 806,455 and 871,001 a liquid feed hydrocarbon is caused to travel through an electric arc while hydrogen is injected concurrently therewith, or a hydrogen-containing or inert atmospheric is maintained in the reaction chamber. But these processes incur the formation of considerable amounts of by-products which reduce the yield. Carbon black is more especially obtained in appreciable quantities.

In the process described in German Pat. No. 587,129, the arc is also allowed to burn in an atmosphere consisting essentially of hydrogen, but the inside walls of the reaction chamber are rinsed with liquid feed hydrocarbon.

As taught in German Pat. No. 1,064,945, the inside wall of the reaction chamber is rinsed with water or heavy oil which is continuously supplied, and calorific energy necessary to achieve the endothermal cracking reaction is produced by subjecting the feed hydrocarbon to partial combustion in the reaction chamber, or it is produced by supplying hot gases from the outside.

Further prior art processes have been disclosed in Pat. No. 160,519, Reichspatentamt, Zwigstelle Oesterreich, which describes an imporved method of utilizing calorific energy in excess available in the reaction chamber for cracking purposes, and in Belgium Pat. No. 544,124 which describes the manner of circulating the feed hydrocarbon and gaseous heat carrier in the reaction chamber.

Still further processes have been disclosed in German Pats. Nos. 1,175,224 and 1,168,419. In the first of these two processes, a rotating, thin and continuously renewing film of liquid feed hydrocarbon is exposed to the simultaneous action of hydrocarbon heated in the electric arc and to the radiation emitted by the arc. In the second of these two processes, hydrogen heated in the arc zone is contacted in a reaction zone following that arc zone with feed hydrocarbon which is used in gas or vapor form, the feed hydrocarbon being supplied tangentially with respect to the reaction zone at the remote end thereof and being caused to flow in a helical line along the walls of the reaction zone countercurrently to the hot hydrogen. At the other end of the reaction zone, the direction of motion of the reaction mixture is reversed and the reaction mixture is caused to flow along the center axis of an axially symmetrical reaction zone and with increasing flow speed into a post-reaction zone to be ultimately quenched. In this latter process, a first partial stream of hydrogen is supplied at the upper rim portion of the arc zone tangentially thereinto, and further partial streams of hydrogen are introduced into that zone along the electrodes so as uniformly to envelop the electrodes. The present invention also uses this method of introducing and heating the hydrogen.

As opposed to conventional methods, the process of the present invention comprises introducing radially with respect to a reaction zone and into hot hydrogen flowing therethrough, near the inflow end of that zone, a first partial stream of feed hydrocarbon in vapor form and in the form of a cone-shaped shell with the apex thereof pointing in the direction of flow of the hot hydrogen, and immediately thereafter introducing tangentially with respect to the reaction zone a second partial stream of feed hydrocarbon in vapor form, and ultimately quenching in conventional manner cracked product leaving the reaction and travelling into a quenching zone.

The first partial stream of the feed hydrocarbon in vapor form is supplied at a velocity of flow of about 20 to 400 m./second in a direction radial with respect to the reaction zone. Hydrocarbons of low molecular weight, e.g. methane, are supplied at a velocity of flow of about 100 to 400 m./second and petroleum hydrocarbons having the means composition $C_6H_{14}$ are supplied at a velocity of flow of about 50 to 150 m./second. The upper limits of these velocities approach sonic velocity in the substances concerned.

The second partial stream of the feed hydrocarbon in vapor form is supplied tangentially with respect to the reaction zone at a velocity of flow of about 100 to 250 m./second. The velocity to be conveniently used for tengential supply depends, and this applies in similar manner to radial supply, on the molecular weight of the feed hydrocarbon employed.

The flow jets of the first partial stream of feed hydrocarbon introduced radially intersect in a common point in the reaction zone at an angle of about 90 to 180°, corresponding to an angle with the horizontal of about 45 to 0°. All of the flow jets thus lie on the generated surface of a straight circular cone of which the apex points in the direction of flow of the hot hydrogen. Radial supply of the first partial stream of the feed hydrocarbon in vapor form into the hot flowing hydrogen ensures intimate mixing therewith, whereas tangential supply of the second partial stream, which immediately follows radial supply, enables the inside walls of the reaction chamber to be efficiently rinsed and carbon deposits on the walls to be avoided.

Hydrocarbon vapors which could produce carbon deposits in the arc zone are prevented in accordance with this invention from penetrating thereinto by appropriately selecting the velocities of flow for hydrogen and for the first partial stream of feed hydrocarbon and by appropriately selecting the angle cutting the jets of the first partial stream of hydrocarbon supplied in radial relationship with respect to the reaction chamber.

Two to seven, preferably two to five kilowatt/hr. are used per cubic meter (S.T.P.) hydrogen to heat the hydrogen supplied portionwise.

The cracked product is quenched in the quenching zone in conventional manner by means of a quenching agent sprayed into the quenching zone in a direction radial thereto. To this end, there may conveniently be used a paraffinic oil, e.g. a paraffinic fuel oil distillate.

An apparatus suitable for use in carrying out the process of the present invention comprises in coaxial arrangement a conventional arc chamber, a circular cylindrical reaction chamber, and a circular cylindrical quenching chamber.

The constructional elements forming the arc chamber have already been described in German Pat. No. 1,168,419, and essential parts thereof are used herein unchanged. The arc chamber comprises a circular cylindrical, cooled chamber having an open bottom portion and a covered top portion provided with openings to receive and with means to hold electrodes. Near its upper rim portion, the arc chamber has hydrogen inlet openings, and the electrodes are passed through special sleeves which enable further partial streams of hydrogen to be introduced along the electrodes into the arc chamber.

Between the arc chamber and the reaction chamber there is a annular slit running all round of which the meridian section corresponds to the base-adjacent portion of the directrix of a straight circular cone whose apex lies in the direction of flow of the reaction mixture on the center axis of the reaction chamber. The annular slit serves to introduce the first partial stream of feed hydrocarbon in vapor form in radial relationship with respect to the flowing hot hydrogen, the point of intersection common to the flow jets being situated on the center axis of the reaction chamber.

Referred to the base of the straight circular cone, the annular slit is arranged at an angle of 0 to 45°.

The reaction chamber is surrounded by an annular channel which communicates with the reaction chamber through outflow openings projecting tangentially thereinto and serving to introduce the second partial stream of evaporated feed hydrocarbon.

An annular slit for supplying quenching agent in radial relationship with respect to flowing hot cracked product, which lies on a plane perpendicular to the center axis of the whole apparatus is disposed in the opening portion of a quenching chamber following the reaction chamber.

An apparatus suitable for use in carrying out the process of the present invention is shown diagrammatically in the accompanying drawings, wherein.

Figure 1:
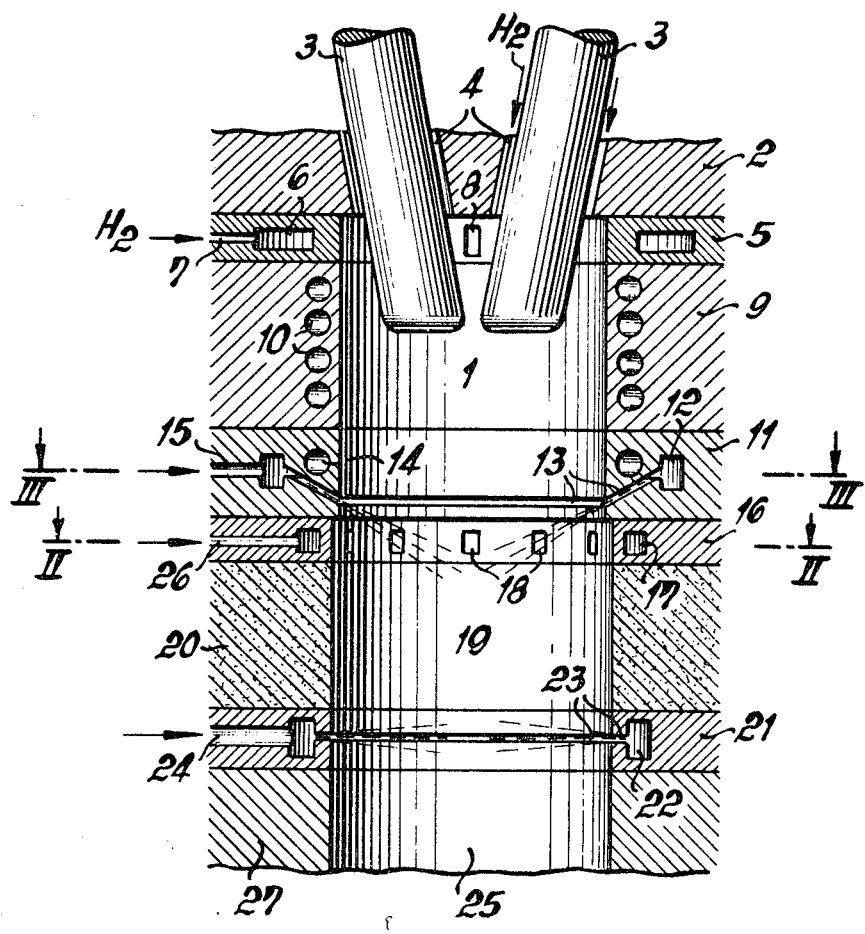
FIG. 1 represents diagrammatically a meridian section through the apparatus of the present invention.

In FIG. 1, the arc chamber 1 essentially comprises a circular cylindrical hollow space built-in in spacer 9. The hollow space has an open bottom portion and is limited upwardly by cover 2 provided with openings to receive and with means to hold the electrodes 3. (Cf. German Pat. 1,168,419.) An annular inflow channel 4 surrounding each electrode serves to introduce hydrogen while enveloping the electrode into the arc chamber.

A distributor ring 5 having an annular channel 6 and serving to introduce further quantities of hydrogen is disposed between cover 2 and spacer 9.

Annular channel 6 communicates through feed line 7 with a hydrogen source and communicates with arc chamber 1 through a plurality of outflow openings 8 uniformly distributed on a circle line and projecting tangentially into arc chamber 1.

Spacer 9 is provided with channels 10 for the supply of a coolant.

Arc chamber 1 is followed in the direction of flow of the hot hydrogen partial streams by spacer ring 11, which is provided with annular channel 12, annular slit 13 and feed channel 14 for the supply of a coolant. Feed line 15 serves to supply the first partial stream of feed hydrocarbon to annular channel 12. Annular slit 13 is in an inclined position with respect to the direction of flow of the hot hydrogen or reaction mixture, which means that feed hydrocarbon issuing therefrom forms the generated surface of a straight circular cone whose apex lies on the center axis of reaction chamber 19. A cross-sectional view of this arrangement taken along lines III—III is shown diagrammatically in FIG. 3.

Distributor ring 16 following spacer ring 11 has a built-in channel 17 which lies in a plane perpendicular to the center axis of reaction chamber 19 and which has outflow openings 18 projecting tangentially into that chamber, the openings 18 serving to supply the second partial stream of feed hydrocarbon. Feed line 26 is intended to introduce feed hydrocarbon into annular channel 17. This arrangement taken along lines II—II is shown diagrammatically in FIG. 2.

Figure 2:
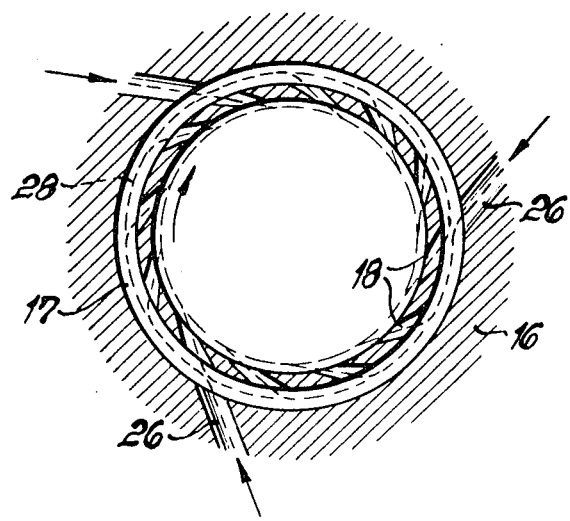
FIG. 2 is a cross-sectional view of the apparatus taken along lines II—II which indicates the constructional details for tangential supply of feed hydrocarbon.
Figure 3:
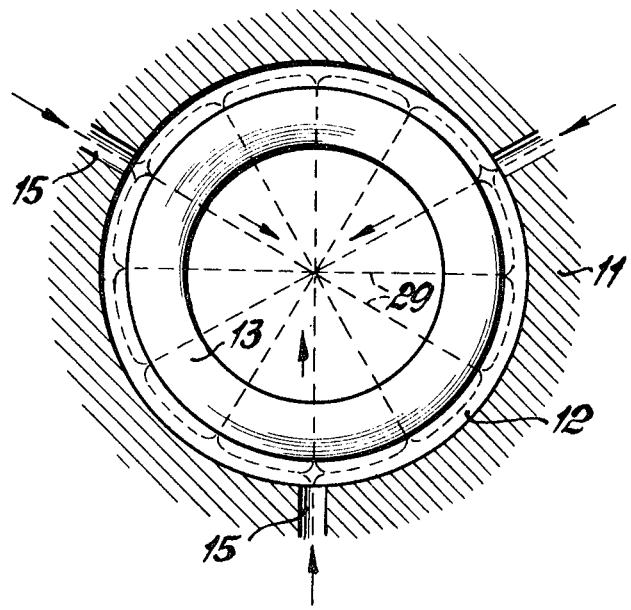
FIG. 3 represents a cross-sectional view of the apparatus taken along lines III—III for radial supply of feed hydrocarbon.

The reference numerals 28 in FIG. 2 and 29 in FIG. 3 represent the flow jets of the flowing starting hydocarbon.

Reaction chamber 19 is installed in reactor structure 20 which may consist e.g. of graphite and is cooled from the outside.

Following reactor structure 20 there is a spacer ring 21 having an annular channel 22 which in the direction to the bore of the spacer ring tapers so as to form an annular slit 23 whose plane is perpendicular to the center axis of the whole apparatus. Quenching agent is introduced into that annular channel by means of feed line 24.

Quenching chamber 25 in whtich freezing of the new chemical equilibrium obtained as a result of the cracking process is completed and which is installed in block 27 is the last section of this arrangement.

Cracked product finally obtained is worked up in conventional manner.

FIG. 1 in the accompanying drawings shows two electrodes 3 of the type used for operation with direct current or monophase alternating current. The apparatus may however be designed when other current is used so as to be operated with a different number of electrodes, e.g. with three electrodes for three-phase current operation.

The process of the present invention for cracking hydrocarbons by means of hydrogen introduced in partial streams into an arc zone, heated therein and conveyed into a reaction zone locally spaced from but immediately following the arc zone comprises more especially introducing radially with respect to the reaction zone, near the inflow end of that zone, a first partial stream of feed hydrocarbon in vapor form and in the form of a cone-shaped shell with the apex thereof pointing in the direction of flow of hot hydrogen, and immediately thereafter introducing tangentially with respect to the reaction zone and again near the opening portion of the reaction zone a second partial stream of feed hydrocarbon in vapor form, and ultimately quenching in conventional manner cracked product leaving the reaction zone.

The apparatus for carrying out the process of the present invention comprises in coaxial arrangement a conventional arc chamber 1 which is essentially closed and has an open bottom portion and is provided with openings to receive and with means to hold electrodes 3 and has associated inflow openings 8 for supplying hydrogen; a circular cylindrical reaction chamber 19 open at its both ends and following the arc chamber 1; a circular cylindrical quenching chamber 25 open at its both ends which serves to quench cracked product and follows reaction chamber 19; means 13 and 18 disposed between arc chamber 1 and reaction chamber 19 and serving to introduce feed hydrocarbon in vapor form into the reaction chamber 19; means 22, 23 and 24 disposed between reaction chamber 19 and quenching chamber 25 and serving to introduce a quenching agent into quenching chamber 25; an annular slit 13 running all round serving to introduce feed hydrocarbon in vapor form and disposed between arc chamber 1 and reaction chamber 19, the meridian sectional view of that annular slit 13 corresponding to the base-adjacent portion of the directrix of a straight circular cone whose apex lies in the direction of flow of reaction mixture on the center axis of reaction chamber 19; and an annular channel 17 having outflow openings 18 projecting tangentially into reaction chamber 19 and supplying feed hydrocarbon in vapor form, the annular channel 17 being disposed below annular slit 13 and being situated on a plane perpendicular to the center axis of the apparatus. The annular slit 13 is provided at the base of a straight circular cone at an angle of 0 to 45°. The apparatus also comprises an annular slit 23 for supplying quenching agent in radial relationship with respect to flowing hot cracked product, the annular slit 23 being situated at the opening portion of quenching chamber 25 on a plane perpendicular to the center axis of the apparatus.

The following example serves to illustrate the process of the present invention:

750 cubic meters (S.T.P.) hydrogen were heated per hour in an electric heavy-current arc kept burning in a water cooled arc chamber 1 between three graphite electrodes 3 with an electric power of 2250 kw. The hydrogen was supplied at a rate sufficient to obtain a velocity of flow of about 70 m./second at the inflow end of reaction chamber 19. 800 kg./hr. gasoline in vapor form boiling at 40–130° C. were sprayed into the hot hydrogen through a water-cooled annular slit 13 with the hydrocarbon jets forming a 30° angle of inclination with respect to the horizontal in the direction of the reactor outlet. The annular slit 13 had a cross-sectional area sufficient to ensure a hydrocarbon outflow velocity of 160 m./second. A further 200 kg./hr. hydrocarbon in vapor form were introduced in tangential relationship with respect to the reaction chamber at a velocity of 200 m./second through six openings 18 disposed at a position immediately below annular slit 13.

Cracked product was quenched by means of a paraffinic fuel oil distillate boiling at 180–350° C., which was supplied at a rate of 50 cubic meters per hour through annular slit 23 and sprayed into the quenching chamber in radial relationship thereto. 1900 cubic meters (S.T.P.) cracked gas which contained 11.5% by volume acetylene and 9.5% by volme ethylene were obtained per hour. No deposition of carbon black was observed in the apparatus.

What is claimed is:

1. In an apparatus for carrying out a process for cracking substances, especially hydrocarbons, capable of being split thermally in the presence of a gas heated in an electric arc and serving as a heat transfer agent, the apparatus comprising in coaxial arrangement a circular cylindrical arc chamber having a top portion with openings arranged to receive electrodes, inflow openings for supplying a first portion of hydrogen along the electrodes so as to coaxially surround the electrodes, and an annular passageway having inflow openings for supplying a second portion of hydrogen tangentially with respect to the arc chamber, a circular cylindrical reaction chamber downstream from the arc chamber, a circular cylindrical quenching chamber downstream from the reaction chamber, a pair of adjacent rings disposed between the arc chamber and the reaction chamber each having inflow means, the inflow means serving to introduce splittable substances in vapor form into the rings and into the reaction chamber, a further ring disposed between the reaction chamber and the quenching chamber having a horizontally arranged inflow slit for introducing a quenching agent into the quenching chamber, the improvement according to which the pair of adjacent rings each have an annular passageway therein for receiving splittable material, an annular inclined slit in the ring closest to the arc chamber extending between the reaction chamber and the annular passageway in that ring, the annular inclined slit being in the form of a truncated cone inclined in a direction away from the arc chamber for introducing splittable material in vapor form into the reaction chamber, and apertures in the ring closest to the reaction chamber extending between the reaction chamber and the annular passageway in that ring, each aperture constructed and arranged to tangentially introduce splittable material in vapor form into the reaction chamber.

2. The combination of claim 1 wherein the annular slit for the supply of splittable substance is disposed at the base of a straight circular cone at an angle of 0 to 45°.

3. The combination of claim 2 wherein the annular slit for supplying quenching agent in radial relationship with respect to flowing hot cracked product is disposed near the opening portion of the quenching chamber, the annular slit being situated on a plane perpendicular to the center axis of the apparatus.

References Cited

UNITED STATES PATENTS

| | | | |
|---|---|---|---|
| 3,114,691 | 12/1963 | Case | 204—171 |
| 3,377,402 | 4/1968 | Sennewald et al. | 260—679 |

JAMES H. TAYMAN, Jr., Primary Examiner

U.S. Cl. X.R.

13—9; 23—209.3, 259.5, 277; 204—171, 324, 328; 219—121; 260—679; 313—231